July 14, 1964 P. S. HOPPER 3,140,583
VECTORING SYSTEM FOR MULTIPLE ROCKET NOZZLE CONFIGURATION
Filed July 21, 1961

INVENTOR
PHILIP S. HOPPER
BY *Vernon F. Hauschild*
ATTORNEY

3,140,583
VECTORING SYSTEM FOR MULTIPLE ROCKET NOZZLE CONFIGURATION

Philip S. Hopper, Manchester, Conn., assignor to United Aircraft Corporation, East Hartford, Conn., a corporation of Delaware
Filed July 21, 1961, Ser. No. 125,734
6 Claims. (Cl. 60—35.54)

This invention relates to rocket engines and more particularly to apparatus for controlling rocket flight in space including direction, attitude and roll control.

It is an object of this invention to teach rocket engine flight control apparatus utilizing controlled discharge of recirculating gas flow between a multiple jet cluster to accomplish flight control.

It is a further object of this invention to teach rocket flight control apparatus in which a shroud envelops a cluster of rocket thrust nozzles to receive recirculating exhaust gases therefrom and to discharge the recirculating gases to atmosphere through door controlled apertures in the shroud walls so that the discharge is either tangential to the rocket engine axis for roll control or perpendicular to the rocket engine axis for direction and attitude control.

Other objects and advantages will be apparent from the specification and claims and from the accompanying drawings which illustrate an embodiment of the invention.

Figure 1:
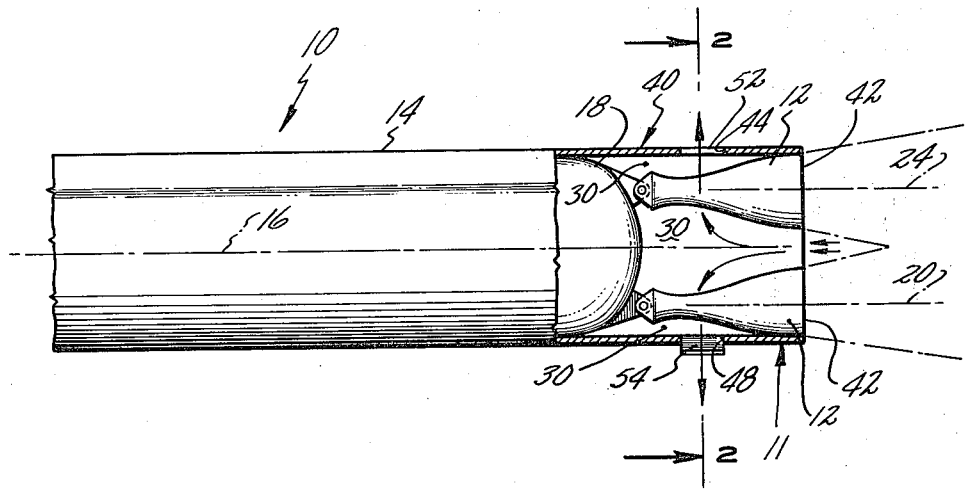
FIG. 1 is a side view of a typical rocket engine partially broken away to illustrate my invention.

Referring to FIG. 1 we see typical rocket engine 10 which may be of either the liquid or the solid propellant type fully described in U.S. Patent No. 2,637,161 or 2,703,960 wherein heated and pressurized exhaust gases are formed either by the burning of a solid propellant or a liquid fuel and oxidizer in a liquid propellant system, which exhaust gases are discharged to atmosphere through a plurality of rocket nozzles or thrust chambers 11. Rocket engine 10 is preferably of circular cross section within case 14 and is concentric about axis 16. Thrust nozzles 12, which form nozzle cluster 11, are connected to engine case 14 through diaphragm or wall 18 thereof and receive the rocket engine exhaust gases for discharge therethrough to atmosphere or space to generate thrust.

Figure 2:
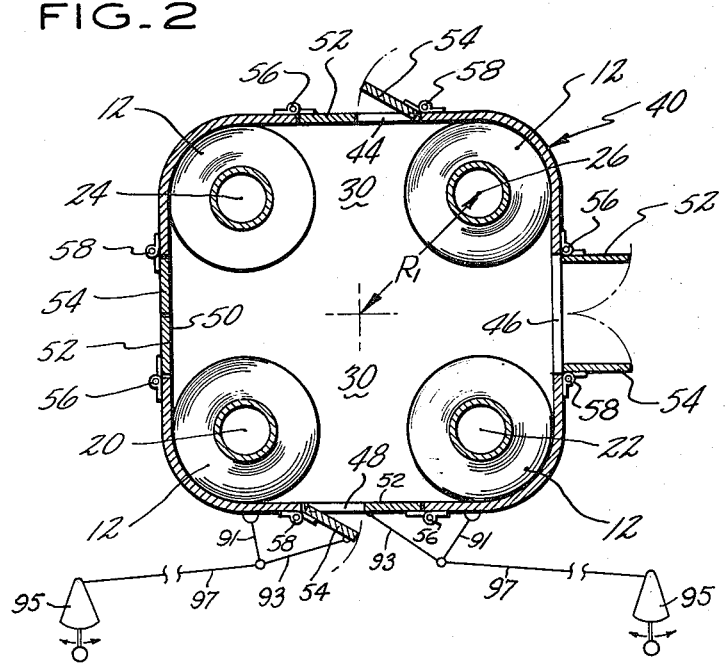
FIG. 2 is an enlarged showing taken along line 2—2 of FIG. 1.

In my preferred embodiment illustrated in FIG. 2, I show a multiple jet or plural thrust chamber exhaust system including four thrust nozzles 12 which are concentric about axes 20, 22, 24 and 26, which axes are parallel to engine axis 16 and spaced an equal radial dimension $R_1$ therefrom and equally spaced circumferentially thereabout to form a void or cavity or space 30 therebetween.

It has been found, quite unexpectedly, that during rocket engine high altiude flight in space wherein a condition of high expansion ratio or high pressure ratio exists, a forward or reverse flow of exhaust gases occurs in recirculating fashion into space 30 between the spaced thrust rocket plurality 11 thereby increasing the base pressure. This recirculation or back flow is caused by the interaction of the multiple jets as they expand at the nozzle discharge. Each of the rocket nozzles has a limited expansion ratio at which point the discharge gas free stream static pressure is equal to the ambient pressure which brings about supersonic exhaust gas velocities flowing in an essentially axial direction. If, however, the ambient pressure is less than the wall static pressure at the nozzle discharge, further expansion occurs at the walls known as the Prandtl-Meyer supersonic expansion process. In this process, the gas stream turns to a degree as it expands in the supersonic regime and the degree of turning depends upon the relationship between the ambient pressure and the wall static pressure at the nozzle discharge. In multi-jet nozzle installations, the Prandtl-Meyer supersonic expansion ratio causes the jet wakes to intersect and exhaust gas recirculation, as shown by arrows in the drawings hereof, in the cavity defined between the jet wakes and nozzles.

It is the teaching of this application to utilize this back flow or recirculating exhaust gas phenomena by capturing the recirculating exhaust gas in a shroud 40 which envelopes space 30 and extends from the engine case 14 at its forward end to thrust nozzle outlets 42. Shoud 40 is open at its after end to admit the entry of recirculating exhaust gases and includes apertures 44, 46, 48 and 50 in the side walls thereof between adjacent thrust nozzles 12. Apertures 44 through 50 are preferably of rectangular cross section and each contains valve means in the form of double-hinged swinging doors 52–54 which, are hinged, preferably throughout their length, to shroud 40 by hinges 56 and 58 to be actuatable between a first position shown at the 9 o'clock position of FIG. 2 wherein doors 52 and 54 block the flow of the recirculating gases through aperture 50, and a second position shown at 12 o'clock and 6 o'clock positions in FIG. 2 wherein the recirculating gases are discharged tangentially to engine axis 16 or the direction of forward thrust for rocket roll control purposes and to a third position shown at 3 o'clock position in FIG. 2 wherein the recirculating gases are discharged perpendicular to engine axis 16 or the direction of forward thrust for steerage and attitude control purposes.

It willl be obvious to one skilled in the art that doors or flaps 52 and 54 may be actuated by a control similar to an auxiliary rocket guidance system or a flight control system such as the type shown in U.S. Patent Nos. 1,871,469 and 2,351,977. Further, pivotal links 91 and 93 may be pivotally attached to case 40 and doors 52–54, respectively, and to each other and connected to calibrated control lever 95 by rod or line 97. It will further be obvious to one skilled in the art that while I have chosen to illustrate my invention on a rocket having four thrust nozzles, it is equally applicable to rocket engines having plural thrust nozzles and in each, the shroud 40 may be cooled by ablation or radiation. In the illustrated configuration, shroud 40 will preferably vary in cross-sectional shape from circular at its forward end to substantially rectangular at its after end but could also be essentially circular and tangent to the nozzle outer diameters.

It is to be understood that the invention is not limited to the specific embodiment herein illustrated and described but may be used in other ways without departure from its spirit as defined by the following claims.

I claim:

1. In a rocket engine having a case and an axis, a cluster of spaced apart thrust nozzles having outlets and axes parallel to said engine axis and connected to said case to receive hot gases from said engine for discharge therethrough to generate thrust, a shroud enveloping said thrust nozzles and extending from said engine case to said thrust nozzle outlets to capture recirculating gas discharged from said thrust nozzles and having apertures therein communicating with the spaces between said nozzles, doors in said apertures, and means to operate said doors between a first position wherein flow therethrough is blocked, a second position wherein recirculating gases are discharged substantially tangentially to said engine axis, and a third position wherein recirculating gases are discharged substantially perpendicular to said engine axis.

2. In a rocket engine having a case and an axis, a cluster of spaced apart thrust nozzles having outlets and axes parallel to said engine axis and connected to said case to receive hot gases from said engine for discharge therethrough to generate thrust, a shroud enveloping said thrust nozzles and extending from said engine case to said thrust nozzle outlets to capture recirculating gas discharged from said thrust nozzles and having apertures therein communicating with the spaces between said nozzles, doors in said apertures, and means to operate said doors to regulate the discharge of recirculating gases for rocket steering control.

3. In a rocket engine, a cluster of spaced apart thrust nozzles having outlets, enclosure means defining a closed chamber around said thrust nozzles and extending forward of said outlets to capture recirculating gas discharged from said thrust nozzles, flaps forming a part of said enclosure means, and means to operate said flaps to regulate the direction of recirculating gas discharge from said enclosure means to control rocket flight direction and roll.

4. In a rocket engine having a case and an axis, a cluster of four spaced apart thrust nozzles having outlets and axes parallel to, equally spaced radially from and circumferentially about said engine axis and connected to said case to receive hot gases from said engine for discharge therethrough to generate thrust, a shroud enveloping said thrust nozzles and extending from said engine case to said thrust nozzle outlets to capture recirculating gas discharged from said thrust nozzles and having four apertures therein located between said thrust nozzles and communicating with the spaces between said nozzles, doors in said apertures, and means to operate said doors between a first position wherein flow therethrough is blocked, a second position wherein recirculating gases are discharged substantially tangentially to said engine axis, and a third position wherein recirculating gases are discharged substantially perpendicular to said engine axis.

5. In a rocket engine having a case and an axis, a cluster of four spaced apart thrust nozzles having outlets and axes parallel to, equally spaced radially from and circumferentially about said engine axis and connected to said case to receive hot gases from said engine for discharge therethrough to generate thrust, a shroud enveloping said thrust nozzles and extending from said engine case to said thrust nozzle outlets to capture recirculating gas discharged from said thrust nozzles and having four apertures therein located between said thrust nozzles and communicating with the spaces between said nozzle, double hinged swinging doors in each of said apertures, and means to operate said doors between a first position wherein flow through said apertures is blocked, a second position wherein recirculating gases are discharged thru said apertures and substantially tangentially to said engine axis, and a third position wherein recirculating gases are discharged through said apertures and substantially perpendicular to said engine axis.

6. The method of controlling high altitude flight direction, attitude and roll of a multiple jet nozzle cluster flight vehicle comprising entrapping the recirculating gas flowing forwardly between the nozzles, and then controllably releasing the entrapped gas in selected directions to effect steering control.

References Cited in the file of this patent

UNITED STATES PATENTS

| | | |
|---|---|---|
| 2,510,506 | Lindhagen et al. | June 6, 1950 |
| 2,780,059 | Fiedler | Feb. 5, 1957 |
| 2,931,170 | Mittelstaedt | Apr. 5, 1960 |
| 2,944,389 | Weinland | July 12, 1960 |
| 2,968,921 | David | Jan. 24, 1961 |